(12) United States Patent
Arunachalam et al.

(10) Patent No.: US 9,668,188 B2
(45) Date of Patent: May 30, 2017

(54) CELL SELECTION

(71) Applicant: Telefonaktiebolaget L M Ericsson (publ), Stockholm (SE)

(72) Inventors: Jagadeesh Arunachalam, Malmo (SE); Torgny Palenius, Barseback (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 49 days.

(21) Appl. No.: 14/403,740

(22) PCT Filed: May 30, 2013

(86) PCT No.: PCT/EP2013/061151
§ 371 (c)(1),
(2) Date: Nov. 25, 2014

(87) PCT Pub. No.: WO2013/182473
PCT Pub. Date: Dec. 12, 2013

(65) Prior Publication Data
US 2015/0139187 A1    May 21, 2015

Related U.S. Application Data

(60) Provisional application No. 61/659,582, filed on Jun. 14, 2012.

(30) Foreign Application Priority Data

Jun. 5, 2012 (EP) ..................................... 12170787

(51) Int. Cl.
*H04W 36/24* (2009.01)
*H04W 48/20* (2009.01)
(Continued)

(52) U.S. Cl.
CPC ....... *H04W 36/24* (2013.01); *H04W 36/0055* (2013.01); *H04W 48/18* (2013.01); *H04W 48/20* (2013.01)

(58) Field of Classification Search
None
See application file for complete search history.

(56) References Cited

U.S. PATENT DOCUMENTS

2007/0202877 A1* 8/2007 Hogan .................. H04W 36/10
                                                                455/436
2012/0135731 A1* 5/2012 Rangaiah .............. H04W 48/20
                                                                455/434
(Continued)

FOREIGN PATENT DOCUMENTS

WO       99/51052 A1    10/1999
WO     2011/022701 A1    2/2011

OTHER PUBLICATIONS

3GPP TS 25.331 V8.17.0 "Radio Resource Control (RRC); Protocol specification" (Release 8), Dec. 2011, pp. 1-773 (file submitted in four parts).
(Continued)

*Primary Examiner* — Diane Lo
(74) *Attorney, Agent, or Firm* — Leffler Intellectual Property Law, PLLC

(57) ABSTRACT

When a user equipment, UE, is in a situation involving selection or reselection of radio cell to use in subsequent communication, in addition to the signal strength, the UE considers the feature set supported in the cell. The type of phone, i.e. a "smart phone", "feature phone", "Facebook-only phone" etc. can also be considered together with information about the usage history. That is, the usage pattern of the mobile and web browsing history.

18 Claims, 3 Drawing Sheets

(51) Int. Cl.
  *H04W 36/00*   (2009.01)
  *H04W 48/18*   (2009.01)

(56) References Cited

U.S. PATENT DOCUMENTS

2012/0315945 A1* 12/2012 Geary ............... H04W 36/0061
                                                    455/514
2013/0242823 A1*  9/2013 Lin ..................... H04B 7/2656
                                                    370/280
2013/0303166 A1* 11/2013 Jain ................... H04W 76/048
                                                    455/435.2

OTHER PUBLICATIONS

3GPP TS 25.401 V10.2.0 "UTRAN overall description" (Release 10), Jun. 2011, pp. 1-54.
3GPP TS 36.331 V10.4.0 "Radio Resource Control (RRC); Protocol specification" (Release 10), Dec. 2011, pp. 1-296.
3GPP TS 36.300 V10.6.0 "Evolved Universal Terrestrial Radio Access (E-UTRA) and Evolved Universal Terrestrial Radio Access Network (E-ETRAN); Overall description; Stage 2" (Release 10), pp. 1-194.
PCT International Search Report, mailed Sep. 4, 2013, in connection with International Application No. PCT/EP2013/061151, all pages.
PCT Written Opinion, mailed Sep. 4, 2013, in connection with International Application No. PCT/EP2013/061151, all pages.
3GPP TS 25.401 V3.2.0 "UTRAN Overall Description (Release 1999)" pp. 1-35, Mar. 2000.

* cited by examiner

CELL SELECTION

CROSS-REFERENCE TO RELATED APPLICATIONS

This application claims priority under 35 U.S.C. §119 to European Patent Application No. 12170787.1, filed Jun. 5, 2012, which is hereby incorporated herein by reference in its entirety. This application also claims the benefit of U.S. Provisional Application 61/659,582, filed Jun. 14, 2012, which is hereby incorporated herein by reference in its entirety.

TECHNICAL FIELD

The field of the present disclosure is that of controlling cell reselection in a cellular radio communication system.

BACKGROUND

Mobile telecommunications networks and the devices that utilize the resources of these networks have evolved during the past couple of decades into networks in which data communication, in contrast to voice communication, is the dominant type of communication. This is of course not least due to the very fast evolution of handheld user equipment, UE, that operate more or less as personal computers with multiple applications running concurrently and exchanging large amounts of packet switched data with each other and other entities connected to the Internet. In other words, with modern day UEs there is a need of being always connected to the network.

Work is going on in the standardizing bodies, such as the third generation partnership project, 3GPP, for improving the performance of UEs as well as other nodes in the networks. Many work items within 3GPP propose improvements that will help UEs in achieving higher bit rate, remain connected for longer periods of time by using shared resources while at the same time consume less battery energy. For example, in the field of work related to high speed packet access, HSPA, the operational states Enhanced Cell-FACH, Enhanced Cell-PCH, Common E-DCH (E-DCH in Cell-FACH) and further enhancements to Cell-FACH (Release 11 of the 3GPP technical specifications) are some of the features that help achieving this. An idea behind these improvements is that while the UE remains connected in the CELL_FACH state, it supports higher data rate both in uplink and downlink and consumes less battery. Secondly, in the beginning of 3GPP standardization, Cell-FACH was supposed to be a transient state between idle and Cell-DCH, but it has evolved to be a stable state in which the UE can stay for long durations.

The features mentioned above are spread over various 3GPP releases starting from Release 6 up until Release 11. However, as the skilled person will realize, actual deployment of these features in the networks will be gradual. Typically, advanced HSPA features will be deployed initially in important urban locations called hotspots. That is, not all cells in a network will be deployed with these features at the same time and there will be partial deployment of these features, which will lead to a situation where cells will have different feature set support. For example, a cell serving an urban area may have many advanced features deployed while an adjacent cell serving a suburban area may not have all features deployed. In addition, different network vendors may have support for different features.

A drawback with such a situation is that a user being near a radio cell boundary, or at a location in the border of coverage area of network nodes, will see different levels of service depending on which cell he/she is connected to. Needless to say, this provides a bad user experience. Moreover, a user that experiences such a situation with different levels of service has no possibility to control selection of a "feature rich" cell even if such a cell is available at the location where the user is present.

SUMMARY

In order to mitigate at least some of the drawbacks as discussed above, there is provided in a first aspect a method in a user equipment for controlling selection of a cell of a cellular radio network to support subsequent communication between the user equipment and the network. The method comprises obtaining feature information relating to communication features supported in a node that controls radio resource usage in the cell and detecting signal strength of a signal received from the network. Based at least in part on the detected signal strength and the obtained feature information, a selection is then made of the cell to support subsequent communication between the user equipment and the network.

Type information relating to a type of the user equipment and usage history information relating to previous usage of communication services by the user equipment can also be obtained. The selection of cell to support subsequent communication is in such embodiments based also on the obtained type information and the obtained usage history information.

That is, a method is provided that, when a user equipment is in a situation involving selection or reselection of radio cell to use in subsequent communication, in addition to the signal strength, the UE considers the feature set supported in the cell. The type of phone, i.e. a "smart phone", "feature phone", "Facebook-only phone" etc. can also be considered together with information about the usage history. That is, the usage pattern of the mobile and web browsing history. Some users may be browsing the web for longer periods of time and use applications that have high quality of service requirement frequently, while some users just use their phone for making voice calls.

Such a method is advantageous in several respects. For example, if a feature rich cell is applied in a "hot spot" which is overlapping with other cells that have fewer features available, the UE can best exploit the services of the hot spot cell by selectively selecting the "hot spot cell" for future communication. Also, such a method enables the UE to make the best out of a network in a partial deployment scenario.

In a second aspect there is provided a user equipment configured to control selection of a cell of a cellular radio network to support subsequent communication between the user equipment and the network. The user equipment comprises control and communication circuitry configured to obtain feature information relating to communication features supported in a node that controls radio resource usage in the cell, detect signal strength of a signal received from the network, and select, based at least in part on the detected signal strength and the obtained feature information, the cell to support subsequent communication between the user equipment and the network.

In a third aspect there is provided a computer program product comprising software instructions that are configured, when executed in a processing device, to perform the method of the first aspect.

The effects and advantages of the second aspect and the third aspect correspond to those summarized above in connection with the first aspect.

DETAILED DESCRIPTION OF EMBODIMENTS

Figure 1:
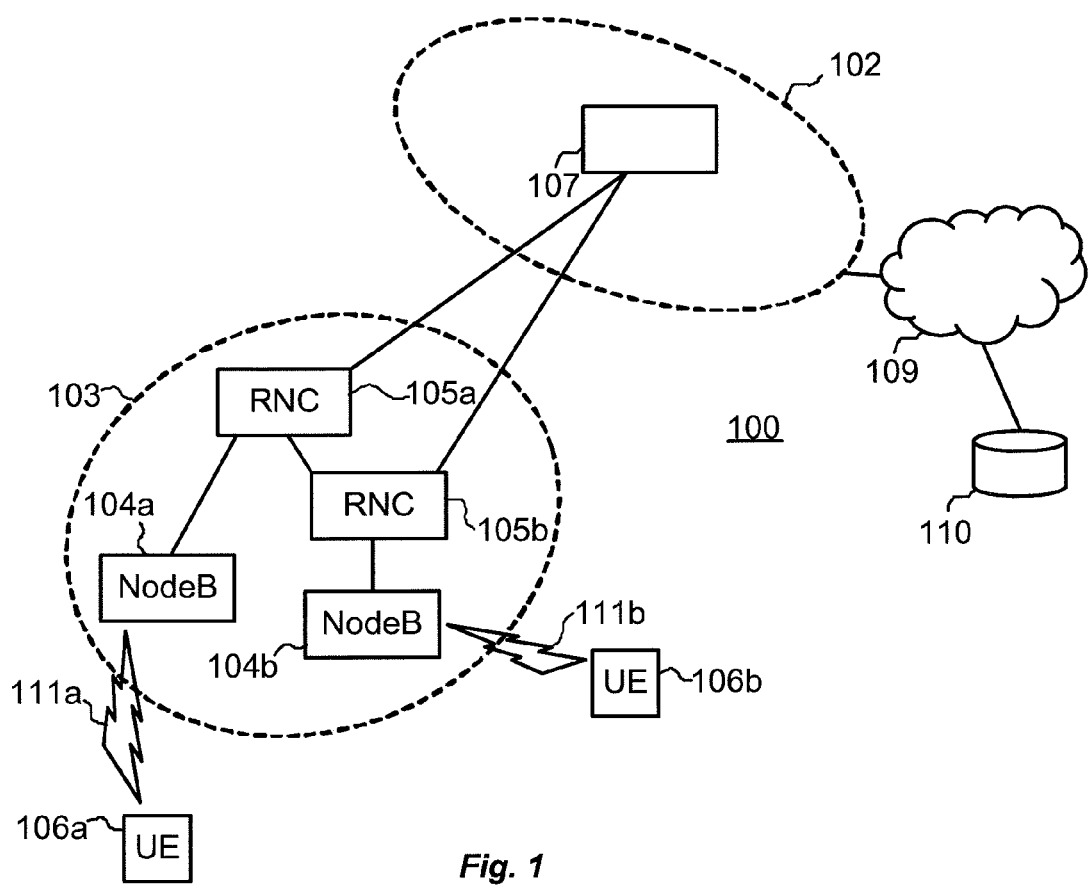
FIG. 1 illustrates schematically a mobile communication system.

FIG. 1 illustrates schematically a mobile communication system in the form of a universal mobile telecommunications system, UMTS, network 100 in which the present methods and apparatuses can be implemented. It should be noted, however, that the skilled person will readily be able to perform implementations in other similar communication systems involving transmission of coded data between nodes.

In FIG. 1 the UMTS network 100 comprises a core network 102 and a UMTS terrestrial radio access network, UTRAN, 103. The UTRAN 103 comprises a number of nodes in the form of radio network controllers, RNC, 105a, 105b, each of which is coupled to a set of neighbouring nodes in the form of one or more NodeB 104a, 104b. Each NodeB 104 is responsible for a given geographical radio cell and the controlling RNC 105 is responsible for routing user and signalling data between that NodeB 104 and the core network 102. All of the RNCs 105 are coupled to one another. A general outline of the UTRAN 103 is given in 3GPP technical specification TS 25.401 V3.2.0.

FIG. 1 also illustrates communicating entities in the form of mobile devices or user equipment, UE, 106a, 106b connected to a respective NodeB 104a, 104b in the UTRAN 103 via a respective air interface 111a, 111b. Mobile devices served by one Node B, such as UE 106a served by NodeB 104a, are located in a so-called radio cell, as will be described in more detail below. The core network 102 comprises a number of nodes represented by node 107 and provides communication services to the UEs 106 via the UTRAN 103, for example when communicating with the Internet 109 where, schematically, a server 110 illustrates an entity with which the mobile devices 106 may communicate. As the skilled person realizes, the network 100 in FIG. 1 may comprise a large number of similar functional units in the core network 102 and the UTRAN 103, and in typical realizations of networks, the number of mobile devices may be very large.

Furthermore, as discussed herein, communication between the nodes in the UTRAN 103 and the mobile devices 106 may follow the protocols as specified by 3GPP HSPA specifications.

Figures 2A, 2B:
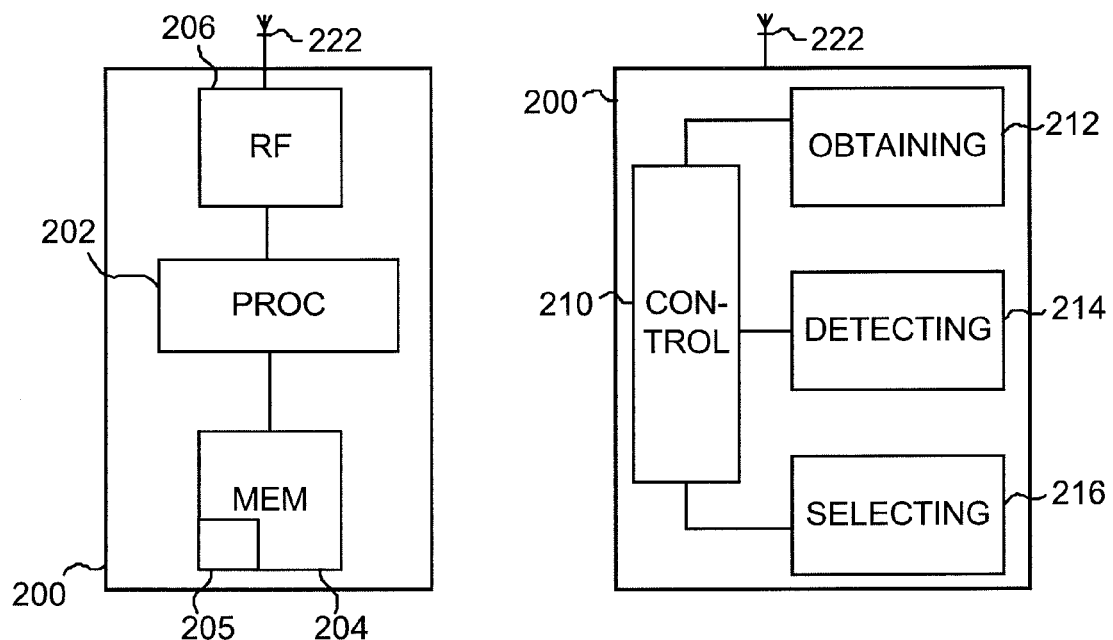
FIGS. 2a and 2b illustrate schematically a user equipment.

FIG. 2a illustrates schematically a mobile communication terminal or user equipment, UE, 200. The UE 200 can correspond to any of the terminals 106 in FIG. 1. The UE 200 comprises a processor 202, a memory 204, radio frequency, RF, receiving and transmitting circuitry 206 and an antenna 222. Radio communication via the antenna 222 is realized by the RF circuitry 206 controlled by the processor 202, as the skilled person will understand. The processor 202 makes use of software instructions 205 stored in the memory 204 in order to control all functions of the terminal 200, including the functions to be described in detail below with regard to controlling cell selection. In other words, at least the RF circuitry 206, the processor 202 and the memory 204 form parts of control and communication circuitry that is configured to control cell selection as summarized above and described in detail below. Further details regarding how these units operate in order to perform normal functions within a mobile communication system, such as the system 100 of FIG. 1, are outside the scope of the present disclosure and are therefore not discussed further.

The mobile communication terminal 200 can also be described in terms of more specific functions, as illustrated in FIG. 2b. In FIG. 2b control circuitry 210 is connected to obtaining circuitry 212, detecting circuitry 214 and selecting circuitry 216. This circuitry can realize methods for controlling cell selection as will be described in more detail below.

Figure 3:
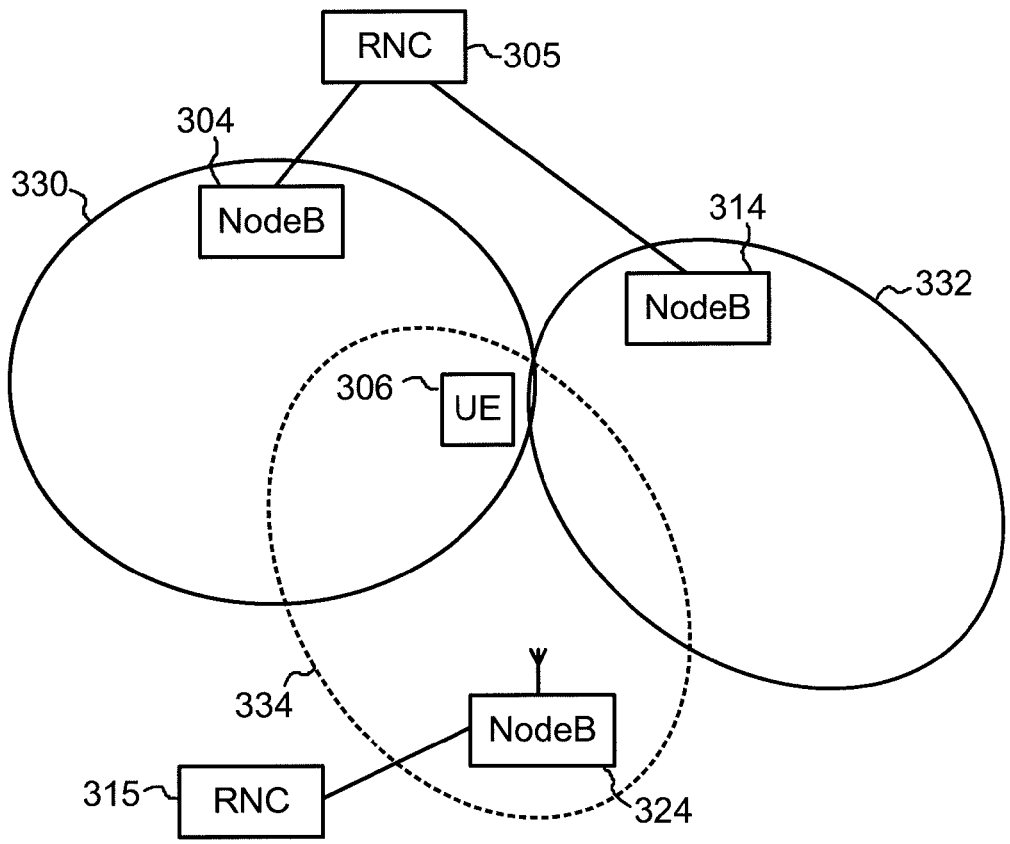
FIG. 3 illustrates schematically cells in a mobile communication system.

FIG. 3 illustrates schematically a geographical region where a first radio cell 330 and a second radio cell 332 of an UTRAN are adjacent to each other and a third cell 334 of the UTRAN overlap the first and second cells. The cells 330, 332,334 can correspond to radio cells in a system such as the system 100 in FIG. 1 and each cell 330, 332, 334 is served by a respective base station or NodeB 304, 314, 324. A first radio network controller, RNC, 305 controls the first and second NodeB 304, 314 and a second RNC 315 controls the third NodeB 324.

An UE 306 is in a situation, in relation to the cells and the RNCs, where it is connected to (or "camping on") the first cell 330. The UE 306 is at the boundary of the first cell 330 and hence it is in a situation where it can perform a reselection of which radio cell to continue being connected to. As will be exemplified below, the procedure of reselecting can involve obtaining information regarding capabilities of the cells 332, 334 in the vicinity of the UE 306 and based ion these capabilities select an appropriate cell.

Figure 4:
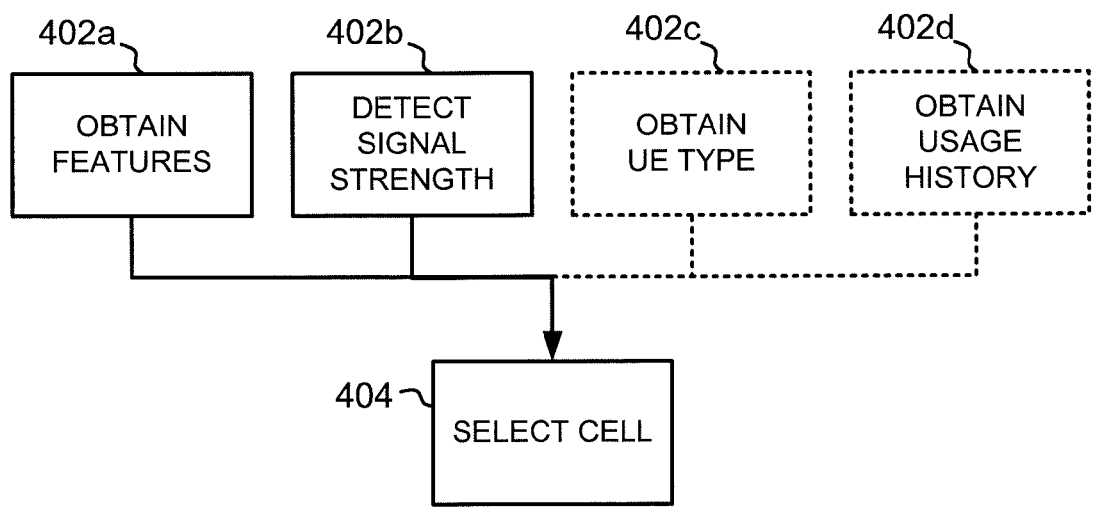
FIGS. 4 and 5 are flow charts of methods for controlling cell selection.

A first example of a method for controlling such reselection (or selection) of a cell is illustrated in the flow chart of FIG. 4. Reference is also made to FIG. 3.

The method commences with an obtaining step 402a and a detection step 402b. The steps 402a and 402b can be performed independently of each other, that is to say they can be performed in parallel as well as sequentially one after the other. Optional obtaining steps 402c and 402d will be described below. In the obtaining step 402a, feature information is obtained that relates to communication features supported in a node that controls radio resource usage in a cell 334, for example the second RNC 315 or the third NodeB 324 (or a combination of node functionality distributed between the second RNC 315 and the third NodeB 324). In the detection step 402b, signal strength of signals from one or more of the NodeBs 304, 314, 324 is detected. Based at least in part on the detected signal strength and the obtained feature information, a selection is then made in a selection step 404 of which cell to support subsequent communication between the UE 306 and the network.

The method can also include an obtaining step 402c where type information relating to a type of the UE is obtained and an obtaining step 402d comprising obtaining of usage history information relating to previous usage of communication services by the UE. The information obtained in these two optional steps can also form part of the basis for the selection step 404.

As suggested by FIG. 3, the obtaining of feature information and the detection of signal strength can be performed for a plurality of cells, e.g. cells 330, 332 and 334, thereby generating a list of candidate cells and where the selection of the cell is performed by selecting from the list of candidate cells. The feature information can be obtained and arranged such that a collection of credits is established for each node wherein credits are given for each communication feature supported by the respective node. As the skilled person will realize, the actual form of the collection of credits can be selected in an appropriate manner depending on how the method is implemented in software and/or hardware.

The obtaining of feature information can be realized such that a ranking value is calculated for each cell, where the ranking value is a function of at least the detected signal strength in the cell, the collection of credits for the node, the type information and the usage history information. In such examples, the selection of cell comprises comparing the ranking values of cells in the list of candidate cells and selecting the cell having the highest ranking value.

The ranking values can be calculated in such a way that a higher ranking value is assigned to a first cell that has a number of credits in the collection of credits that is higher by a first credit threshold number than the number of credits in the collection of credits of a second cell, the second cell having a signal strength that is higher by a first signal strength than the signal strength of the first cell.

The ranking values can also be calculated in such a way that, as a consequence of a determination that the signal strength in the cell is lower than a third threshold signal strength, the collection of credits is disregarded in the calculation of the ranking value for the cell.

The ranking values can also be calculated in such a way that a load value related to the node in the cell is determined and, if the load value is higher than a threshold load value, the cell is disregarded in the selection.

The method can also comprise a step of displaying an indicator of at least one communication feature that is supported in the cell. Such embodiments can comprise receiving a user input indicator that indicates a desire to use the displayed at least one communication feature supported in the cell. The user input indicator can then be utilized in the cell selection step.

As indicated above, the cellular network can be a third generation partnership project, 3GPP, universal terrestrial radio access, UTRA, network or a long term evolution, LTE, network. The user equipment is camping on a first cell, e.g. cell 330, associated with a serving radio network controller, SRNC, e.g. RNC 305 in FIG. 3 (or an eNodeB in a LTE network). The obtaining of feature information can then comprise receiving a plurality of system information messages comprising system information blocks, SIBs. Feature information is then extracted from the SIBs, the feature information relating to at least a second cell, e.g. cell 334 in FIG. 3, that is neighbouring the first cell, and the selection of the cell to support subsequent communication can comprise selecting the second cell 334 to support subsequent communication.

In embodiments of the method in UTRA, the communication features can comprise any of support for enhanced cell fast access channel, CELL-FACH, state, support for paging message reception on cell paging channel, PCH, and thereby autonomous transition to CELL-FACH state,—support for enhanced dedicated channel, E-DCH, state in CELL-FACH state, support for high speed downlink packet access, HSDPA, support for high speed uplink packet access, HSUPA, support for high speed downlink shared channel, HS-DSCH, discontinuous reception, DRX, operation in CELL-FACH state, and support for dual cell communication. In LTE embodiments, the communication features can comprise support for internet protocol multimedia subsystem, IMS, bearers for UEs in limited service.

In embodiments of the method in UTRA, the method can also comprise extracting, from a previously received SIB, an identity of an RNC of the second cell, and if the identity of the RNC of the second cell is different than the identity of the SRNC, performing the selection of the second cell to support subsequent communication only if the serving RNC and the RNC of the second cell have a connection via an IuR interface. Moreover, the performing of the selection of the second cell to support subsequent communication can be conditioned such that it is done only if identity of the RNC of the second cell is equal to the identity of the SRNC.

Figure 5:
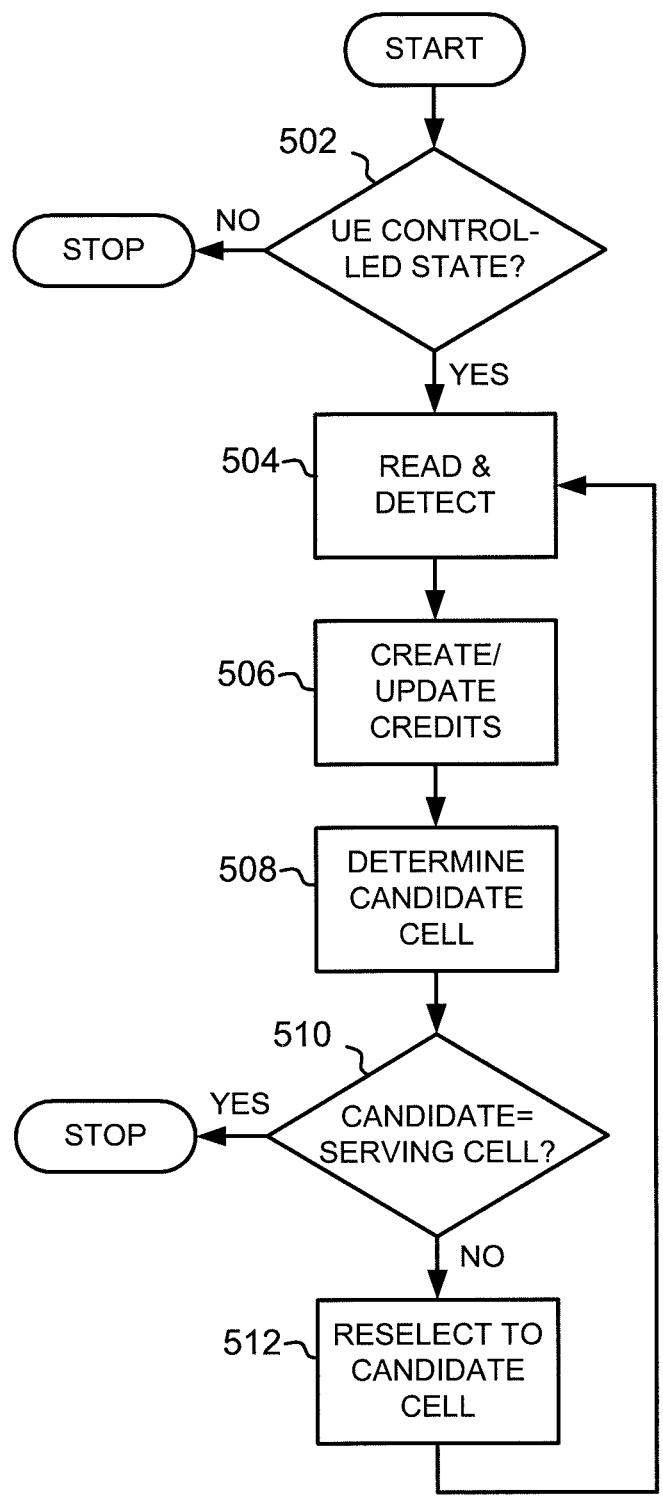

Turning now to FIG. 5, another example will be described of a method in a UE for controlling selection of a cell of a cellular radio network to support subsequent communication between the user equipment and the network. The method in FIG. 5 is realized in a 3GPP high speed packet access, HSPA, system and the UE is currently camping on a serving cell associated with a serving RNC in the network. As the skilled person will realize and as will be exemplified below, the steps of the method illustrated in FIG. 5 can be realized by corresponding features in a LTE system.

The method commences with a checking step 502 where it is checked whether the UE is in any UE controlled state, i.e. the idle operational state or any of the non-cell DCH states (i.e. CELL-FACH, CELL/URA PCH) in a UTRAN. If so, the method continues with a read and detection step 504 where the identity of, and information related to, RNCs of neighbouring cells and of the serving RNC are read from a broadcast of system information blocks, SIB. Information regarding RNC identities are obtained from type 3 messages, SIB3, and information regarding the features supported by the RNC in each neighbouring cell is obtained from information elements, IE, of type 5 and type 6 messages. Detection of signal strength of respective RNC is also performed during this step. The signal strength can, for example, be in terms of received signal code power, RSCP, and signal to noise ratio Ec/No.

The presence of "HS-DSCH Common System Information" IE signals if the network supports Enhanced Cell-FACH (HS in CELL-FACH). For a Network that does not support this feature, the UE should first have to use SCCPCH during connection establishment and later be moved to HS-PDSCH. If the feature is supported and signalled in SIB5, the UE does not connect using SCCPCH channel, but uses HS-DSCH channel directly. This saves time and improves throughput since UE gets immediate access to HS channels.

The presence of "HS-DSCH Paging system Information" IE signals that the network supports paging message reception on cell-PCH and thereby autonomous transition to CELL-FACH.

The presence of "Common E-DCH system Info" IE signals that the network supports E-DCH in CELL FACH state.

The presence of "HSDPA Cell Indicator" IE signals that the network/cell supports HSDPA. The presence of "E-DCH cell Indicator" IE signals that the network/cell supports HSUPA.

The presence of "HS-DSCH DRX in CELL FACH" IE signals that network supports HS-DSCH DRX operation in CELL-FACH state. An UE camped on this cell and using this feature potentially saves battery time.

Then follows a credits step 506 of creating and/or updating a collection of credits for neighbouring cells and for the serving cell, where credits are given for each feature supported by the respective RNC. It is to be noted that the collection of credits is not restricted to the features mentioned above; it can be extended to any features support that can be derived from system information messages.

A determination step 508 is then performed where the collection of credits and the signal strength for each cell are considered in order to enable a choice of cell for subsequent communication. That is, a list of candidate cells including the serving cell (e.g. the first cell 330 FIG. 3) is calculated as a function of:

1) The signal strength of the cell. That is, for UTRAN RSCP and CPICH_Ec/No, being the ratio between the received energy per PN chip of the common pilot channel, CPICH, and the total received power density No, being related to the quality of the received signal from the cell. For E-UTRAN, received reference signal received power, RSRP, and reference signal received quality, RSRQ.
2) Is it an inter-frequency, an intra-frequency or an inter radio access technology, inter-RAT, cell reselection.
3) The calculated credits of the corresponding RNC, or eNodeB in a LTE system, based on the feature set described above.
4) The type of the phone and the features typically used in the past, collected in a history list.

The UE may not make use of all features alike, since the type of phone and browsing history is different for each UE. Depending on these factors, weights/credits can be given to each feature in such a way that one feature has more influence on the ranking algorithm than the other.

During this determination, several considerations have to be made. For example, if a cell belonging to a RNC has considerably more credits than the serving cell but the signal strength is lower by a predefined value (e.g 2 dB) than the best cell, then the UE shall reselect to the cell with highest credits.

As another example, if the serving cell has a low RSCP (close to sensitivity) or a low Ec/No (close to performance limit) then the credits should not be taken into account while calculating the candidate list.

The following points can beneficially be considered while choosing the cell:

Choosing a non-best cell should not result in a significantly degraded performance of the system due to increased interference levels. Care should be taken in cases where UE is on a HS channel with a high data rate. When the UE is at a border between two RNCs, it shall be able to select a cell with more functionality, but due to the WCDMA system it cannot be allowed to select a cell which is much weaker than the best cell.

A particular RNC is not heavily loaded due to many UE's requesting service from it.

It is most suitable for UEs requiring power save optimizations or performance optimizations rather than UEs which shall support high data rate due to signal interference reasons.

The predefined value for the signal strength difference with respect to the signal strength of the best cell shall neither be too large nor too small and there shall be a trade-off between the credits table and the ranked cell table.

After this determination of a choice of cell for subsequent communication there follows a checking step 510 where a check is made whether or not the chosen cell is the serving cell. If the chosen cell is the already serving cell, no further action is needed. Otherwise, the method continues with a reselection step 512 where a cell reselection procedure is performed with the chosen cell that was determined in the determination step 508.

The procedure of the read and detection step 504, the credits step 506, the determination step 508 and the checking step 510 is then repeated until the checking step 510 finds that the serving cell is the chosen cell.

It is to be noted that the method presented above can, in addition to application in UTRAN, be applied to evolved UTRAN, E-UTRAN, system as well. The radio resource configuration information common to the UE's are in E-UTRAN systems provided in system information messages. The eNodeB Identifier (eNB ID) is contained within cell Identifier, CI, and is broadcast in SystemInformationBlockType1. The UE can construct a credits table per eNodeB (respectively cells) based on the service supported and use this information as input to the cell ranking criteria.

To summarize the advantages of controlling cell selection as described above:

An advantageous use of having the knowledge of RNC ID while reselection, is that after a radio link failure when the UE attempts to perform a call re-establishment procedure, the UE can camp on a cell belonging to the SRNC and send cell update message. If the UE sends cell update on a cell belonging to another RNC that is not connected with SRNC with a IuR interface, then the network would release the connection and call would be dropped.

UE considers the service aspects as a factor in considering which cell to choose. UE can provide best quality of service to its application. UE can save battery power. UE can have fewer drops if it selectively chooses the cell to which call establishment procedure is started.

A stationary UE for e.g. MTC (Machine Type communication)/PC card can benefit from the feature in RNC boundary, since at RNC boundary they see the same cells belonging to two or more different RNCs all the time.

Applying this idea at a cell level has the advantage that if a feature rich cell is applied in a hot spot which is overlapping with other cells, the UE can best exploit the services of the hot spot cell by selectively camping on it.

The selection of RNC in overlapping area can be user driven. The user can be provided an option in menu and he can choose an RNC (respective cell) based on its service aspects/congestion aspects. When a user moves into a area having better service aspects, a message can pop-up prompting the user to decide if he wants to camp on the cell in a RNC or not.

"Relay for HSPA" is being discussed as a possible addition to 3GPP Release 12 standard. A HSPA relay extends HSPA coverage provided by a network node beyond its boundary. Hence, with relays, the RNCs footprint can be extended well beyond the current boundary. Hence, the idea of service based reselection has increased applicability when HSPA relays are deployed.

UE can make the best out of the network in partial deployment scenario

When the UE comes in the vicinity of a service rich network node (RNC, eNodeB etc.), a pop-up menu can be displayed prompting the user to select it. This way the decision can be left to the user to choose the cell/network node or not. It can also be provided as a menu option.

The invention claimed is:

1. A method in a user equipment for controlling selection of a cell of a cellular radio network to support subsequent communication between the user equipment and the network, the method comprising:
   obtaining feature information relating to communication features supported in a node that controls radio resource usage in the cell;
   detecting signal strength of a signal received from the network; and
   selecting, based at least in part on the detected signal strength and the obtained feature information, the cell to support subsequent communication between the user equipment and the network.

2. The method of claim 1, further comprising:
   obtaining type information relating to a type of the user equipment,
   obtaining usage history information relating to previous usage of communication services by the user equipment, and
   wherein the selection of the cell to support subsequent communication is based also on the obtained type information and the obtained usage history information.

3. The method of claim 1, wherein the obtaining of feature information and the detection of signal strength is performed for a plurality of cells, thereby generating a list of candidate cells and wherein the selection of the cell is performed by selecting from the list of candidate cells.

4. The method of claim 3, wherein the obtaining of feature information is performed such that a collection of credits is established for each node wherein credits are given for each communication feature supported by the respective node.

5. The method of claim 4, comprising:
   calculating a ranking value for each cell, wherein the ranking value is a function of at least the detected signal strength in the cell, the collection of credits for the node, the type information and the usage history information, and wherein the selection comprises:
   comparing the ranking values of cells in the list of candidate cells and selecting the cell having the highest ranking value.

6. The method of claim 5, wherein the calculation of the ranking value comprises:
   assigning a higher ranking value to a first cell that has a number of credits in the collection of credits that is higher by a first credit threshold number than the number of credits in the collection of credits of a second cell, the second cell having a signal strength that is higher by a first signal strength than the signal strength of the first cell.

7. The method of claim 5, wherein the calculation of the ranking value comprises:
   as a consequence of a determination that the signal strength in the cell is lower than a third threshold signal strength, disregarding the collection of credits in the calculation of the ranking value for the cell.

8. The method of claim 5, wherein the calculation of the ranking value comprises:
   determining a load value related to the node in the cell, and
   if the load value is higher than a threshold load value, disregarding the cell in the selection.

9. The method claim 1, further comprising:
   displaying an indicator of at least one communication feature that is supported in the cell.

10. The method of claim 9, further comprising:
    receiving a user input indicator that indicates a desire to use the displayed at least one communication feature supported in the cell; and
    as a consequence of the received user input, performing the selection of the cell based also on the user input indicator.

11. The method of claim 1, wherein the cellular network is a third generation partnership project (3GPP) universal terrestrial radio access (UTRA) network, wherein the user equipment is camping on a first cell associated with a serving radio network controller (RNC), and
    wherein the obtaining of feature information comprises:
       receiving a plurality of system information messages comprising system information blocks (SIBs);
       extracting the feature information from the SIBs, the feature information relating to at least a second cell that is neighbouring the first cell; and
    wherein the selection of the cell to support subsequent communication comprises:
       selecting the second cell to support subsequent communication.

12. The method of claim 11, wherein the communication features comprise any of:
    support for enhanced cell fast access channel (CELL-FACH) state,
    support for paging message reception on cell paging channel (PCH) and thereby autonomous transition to CELL-FACH state,
    support for enhanced dedicated channel (E-DCH) state in CELL-FACH state,
    support for high speed downlink packet access (HSDPA),
    support for high speed uplink packet access (HSUPA),
    support for high speed downlink shared channel (HS-DSCH) discontinuous reception, DRX, reception (DRX) operation in CELL-FACH state, and
    support for dual cell communication.

13. The method of claim 11, further comprising:
    extracting, from a previously received SIB, an identity of an RNC of the second; and
    if the identity of the RNC of the second cell is different than the identity of the SRNC, performing the selection of the second cell to support subsequent communication only if the serving RNC and the RNC of the second cell have a connection via an IuR interface.

14. The method of claim 11, further comprising:
    extracting, from a previously received SIB, an identity of an RNC of the second cell; and
    if the identity of the RNC of the second cell is equal to the identity of the SRNC, performing the selection of the second cell to support subsequent communication.

15. The method of claim 1, wherein the cellular network is a third generation partnership project (3GPP) long term evolution (LTE) network, wherein the user equipment is camping on a first cell associated with an evolved universal terrestrial radio access network NodeB (eNodeB), and
    wherein the obtaining of feature information comprises:
       receiving a plurality of system information messages comprising system information blocks (SIBs);
       extracting the feature information from the SIBs, the feature information relating to at least a second cell that is neighbouring the first cell; and
    wherein the selection of the cell to support subsequent communication comprises:
       selecting the second cell to support subsequent communication.

16. The method of claim 15, wherein the communication features comprise:

support for internet protocol multimedia subsystem (IMS) bearers for UEs in limited service.

17. A user equipment configured to control selection of a cell of a cellular radio network to support subsequent communication between the user equipment and the network, the user equipment comprising control and communication circuitry configured to:
  obtain feature information relating to communication features supported in a node that controls radio resource usage in the cell;
  detect signal strength of a signal received from the network; and
  select, based at least in part on the detected signal strength and the obtained feature information, the cell to support subsequent communication between the user equipment and the network.

18. A non-transitory processor-readable storage medium comprising software instructions that, when executed in a processor, performs a method in a user equipment for controlling selection of a cell of a cellular radio network to support subsequent communication between the user equipment and the network, the method comprising:
  obtaining feature information relating to communication features supported in a node that controls radio resource usage in the cell;
  detecting signal strength of a signal received from the network; and
  selecting, based at least in part on the detected signal strength and the obtained feature information, the cell to support subsequent communication between the user equipment and the network.

* * * * *